May 24, 1932.   A. E. PAYSON ET AL   1,859,887
REFRIGERATING APPARATUS
Original Filed Sept. 21, 1928

INVENTORS
AURINE PAYSON
MINER F. WETMORE
BY
ATTORNEY

Patented May 24, 1932

1,859,887

UNITED STATES PATENT OFFICE

AURIN E. PAYSON AND MINER P. WETMORE, OF NORWICH, CONNECTICUT

REFRIGERATING APPARATUS

Original application filed September 21, 1928, Serial No. 307,348. Divided and this application filed July 24, 1929. Serial No. 380,541.

Our invention relates to refrigerating apparatus, and its object is to provide a cabinet particularly adapted to keep ice cream and other confections at the required low temperature by means of solidified carbon dioxide gas or like refrigerant. For this purpose we employ a heat-insulated receptacle properly mounted in a suitable casing. This receptacle, which is preferably a jar of the double-walled vacuum type, has a bottom chamber for containing a supply of dry ice or other refrigerating agent. The top of the cooling chamber is closed by a disk or plug on which rests a metal plate connected with the cooling chamber by heat-conducting members of metal, such as chains or rods of copper or brass, and the like. The confection to be frozen is contained in a metal can placed on the metal plate, so that a continuous metallic connection is established between the refrigerant at the bottom of the jar and the material in the can. This is important, as otherwise the carbon dioxide gas, which is heavier than air and tends to settle at the bottom of the jar, will not refrigerate the upper space around the can low enough to keep ice cream in frozen condition.

The feature of our refrigerating apparatus claimed in this application, which is a division of our copending case filed September 21, 1928, Serial Number 307,348, comprises a double-walled vacuum jar provided with an inner lining of molded material, such as bakelite, hard rubber, asphaltum, and the like. This lining not only reinforces the inner glass wall, but prevents shattering of the glass in the event of breakage. In some cases the molded lining may be covered with a sheet metal shell, which strengthens the lining and also acts as a conductor of heat (or cold).

The practical advantages of our invention will be fully understood from a detailed description of the embodiment illustrated in the accompanying drawings in which—

Figure 1:
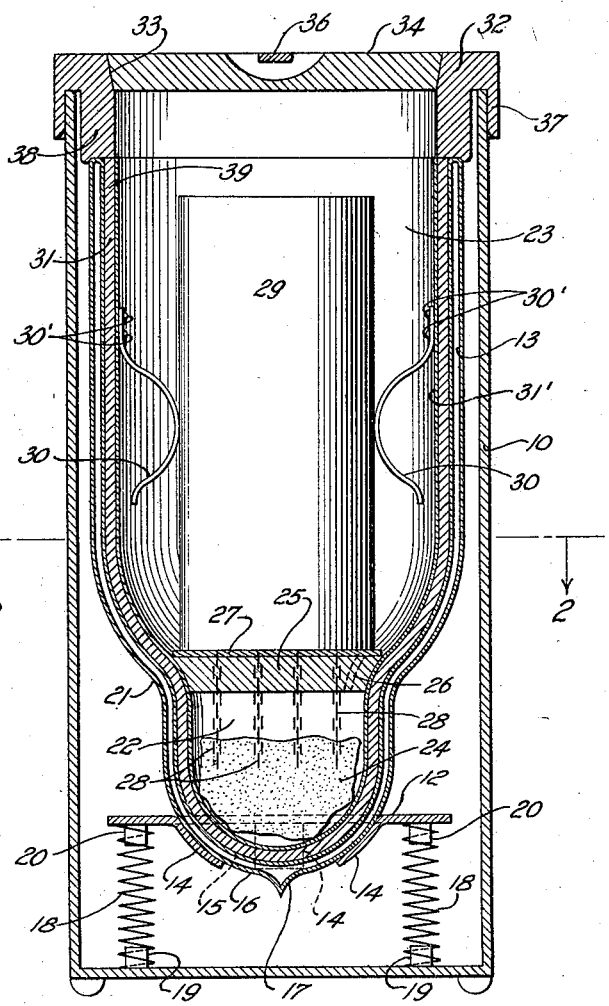
Figure 2:
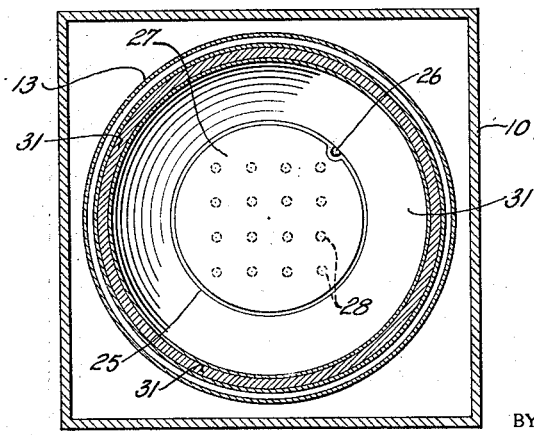

Fig. 1 is a vertical section through an ice cream cabinet constructed in accordance with our invention; and Fig. 2 is a horizontal cross-section on line 2—2 of Fig. 1.

An outer casing 10 is provided at the bottom with a spring support 12 adapted to receive a heat-insulated receptacle 13. If the casing 10 is of wood, it is cheapest to construct it as a rectangular box; but if it is of sheet metal, the best way is to make it in cylindrical shape. The particular construction of the outer casing is immaterial, provided it is practical to use. The spring support 12 may comprise a sheet metal plate provided with radial arms or extensions 14, which are so shaped as to form a spherical recess 15 adapted to receive the rounded bottom 16 of receptacle 13. In the broader aspect of our invention, the receptacle or container 13 may be of any practical construction and design, but at this time we prefer a double-walled vacuum jar of strong glass, such as pyrex glass, which is capable of withstanding mechanical shocks and changes of temperature. For brevity and convenience we shall refer to the receptacle 13 as a jar, without thereby intending any structural limitation here and in the claims. The annular vacuum space between the inner and outer walls of jar 13 is evacuated through a tip 17, which is accommodated in the central space between the extensions 14 of plate 12. Strong compression coil springs 18 act as a resilient mounting for the jar-supporting plate 12. The lower ends of springs 18 are attached to lugs 19 on the bottom of casing 10, and the other ends of the springs are connected to lugs 20 projecting from the bottom of support 12. Any other practical form of resilient mounting for the jar 13 may be employed.

The heat-insulated jar 13 is provided with an annular shoulder or breast portion 21, which divides the jar into a small lower chamber 22 and a large upper chamber 23 of greater diameter than the lower chamber, which is adapted to contain a suitable refrigerant 24. At the present time we prefer to use dry ice, as solidified carbon dioxide is commercially known, because it is easily available and performs its intended function with satisfactory results. The cooling chamber 22 is closed by a disk or plug 25, preferably of non-conducting material, such as bakelite, hard rubber, cork and the like. The plug 25 has one or more vents 26 to permit the escape of carbon dioxide gas from chamber 22 into the upper chamber 23. On top of the insulated plug 25 rests a metal plate or disk 27 to which metallic heat-conductors 28 are attached. The conductors 28 are shown as chains, but they may be rods, coils, or other practical forms of metallic heat-conductors for establishing a good thermal connection between the cooling chamber 22 and the metal plate 27. Chains of copper have been found to give satisfactory results. The plug 25 is provided with holes through which the metal conductors 28 extend into the cooling chamber.

A metal can 29 containing a suitable confection is placed on the metal plate 27, so that a direct metallic heat-conducting connection is established between the refrigerant in chamber 22 and the confection in can 29. In this way, the cooling action of the refrigerant is effectively communicated to the contents of container 29. Springs 30 hold the container 29 in firm position on the metallic supporting plate 27, and at the same time they act as shock absorbers in a lateral or radial direction. The inside of glass jar 13 is preferably provided with a lining 31 molded of bakelite, asphaltum, hard rubber, or the like, to conform to the shape of the jar, and over the lining 31 fits a sheet metal shell 31' of good heat-conducting properties. This shell may be spun of aluminum, brass, copper, iron and so on. The lining 31 constitutes a heat-insulating backing for the conducting shell 31', which forms a metal connection of large surface area between the freezing chamber 22 and the upper chamber 23 where the confection is located. The parts 31 and 31' not only improve the heat-insulating properties of the jar, but also protect the jar against breakage. The plug 25 rests on the metal shell 31', which is preferably in direct contact with the periphery of metal plate 27. It is convenient to attach the centering springs 30 to the metal shell 31', as shown at 30'. If asphaltum is used for the lining 31, it may be poured in a liquid state into the space between the jar and the metal shell 31'. This allows the liquid asphaltum to take up any irregularities or unevenness in the adjacent glass and metal surfaces.

The top of the outer cabinet 10 is closed by a cover 32 which is preferably of heat-insulating material like bakelite, hard rubber or other molded composition. The cover 32 has a circular opening 33 adapted to be closed by a stopper 34, which may be of the same material as the cover. To leave the top of stopper 34 flat, it may be provided at the center with a recess 35 bridged by a finger piece 36, which may be molded integral with the stopper or a separate metal strip imbedded at its ends in the molded material of the stopper. The cover 32 has an outer flange 37 adapted to fit over the upper rim of cabinet 10, and the inner wall of the cover is formed with an annular shoulder 38 and an annular extension 39. The shoulder 38 engages the top of jar 13, and the extension 39 engages the top of the shell 31, whereby the jar and its shell are firmly held in upright position by the cover 32. The opening 33 is wide enough to permit the easy insertion and removal of the container 29. The stopper 34 may have one or more vents to permit the escape of carbon dioxide gas when the pressure in chamber 23 becomes too great. In the ordinary use of the ice cream cabinet, the frequent removal of the stopper allows the escape of accumulated gas from the cabinet.

It will be seen from the preceding description that we have provided a simple, compact and efficient refrigerating device for keeping confections at the required freezing temperature. The parts are easy to assemble and easy to separate, so that the replenishing of the refrigerant is a simple matter. The use of dry ice not only gives better refrigeration than ordinary water ice, but it permits the cabinet to be always dry and easily kept clean. In the old form of ice cream cabinets, the ice cream cans are placed in a mass of packed ice, which on melting is liable to produce an unsightly condition behind the counter where the ice cream is dispensed. This cannot happen in the use of our new refrigerating cabinet. Furthermore, ice cream cabinets containing water ice are rather bulky affairs, since the ice chamber must be comparatively large. The cabinet of our invention can be made very compact and need not be much larger than the jar that contains the ice cream can. This compactness of structure is of practical importance, since the space behind counters in many of the stores is limited, and a saving of space is always a factor of economy in stores where high rents prevail.

The molded shell 31 is of special advantage because it makes the jar safe to use by preventing the shattering of glass if the jar should break. When the vacuum in jars of this type collapses, as sometimes happens, the glass is blown to a fine powder which flies in all directions at high velocity. People have been injured in accidents of that kind, and attendants have handled the unprotected jars with a feeling of risk. All these dangers and difficulties are completely eliminated by our shell-lined jar, which can not injure anybody even if it should explode. The shell 31 is readily inserted and removed, and is easy to keep clean. The outer sheet metal cover 31' increases the strength of composite linings 31—31' and facilitates the distribution of cold in the jar. We want it understood, however, that the metal shell 31' is not necessary in all cases, particularly in jars having no separate dry-ice chamber. So far as our protective lining is concerned, the jar may be of any practical shape and we do not limit ourselves to the special form of jar shown in the drawings.

Although we have shown and described a specific construction, we want it understood that our invention is not limited to the details set forth. Changes and modifications may be adopted without departing from the scope of the invention as defined in the following claims.

We claim as our invention:

1. The combination of an outer casing adapted to hold a double-walled vacuum jar of glass, a shell of molded insulating material removably fitted within said jar, a second shell of imperforate sheet metal removably fitted within said insulating shell, an annular member removably mounted on top of said casing and engaging the rim of said jar to assist in supporting the latter firmly in upright position, said annular member being out of engagement with said inner metal shell so that the latter may be removed without disturbing said member, and a removable stopper for closing said annular member.

2. The combination of an outer casing having means inside to engage the base portion of a double-walled vacuum jar and support the same in upright position, the top rim of said jar terminating below the top edge of said casing, a shell of molded insulating material removably fitted within said jar and terminating substantially flush with the rim of the jar, an apertured member removably mounted on top of said casing and having an annular shoulder projecting into the casing to engage the top edge of said jar and shell, whereby said jar and shell are rigidly held as a unit in said casing, a second shell of sheet metal removably fitted within said insulating shell and insertable through the aperture in said member, whereby said second shell is removable and replaceable without disturbing the insulating shell, and a cover for closing said apertured member.

AURIN E. PAYSON.
MINER P. WETMORE.